United States Patent [19]

Nakamura

[11] Patent Number: 4,702,126
[45] Date of Patent: Oct. 27, 1987

[54] AXIAL GEAR TRAIN HAVING SYNCLINE FACE CYCLOID GEARING

[76] Inventor: Takeichi Nakamura, 6-12, Hojo 6-chome, Daitoshi, Osaka, Japan, 574

[21] Appl. No.: 706,298

[22] Filed: Feb. 27, 1985

Related U.S. Application Data

[63] Continuation-in-part of Ser. No. 431,089, Sep. 30, 1982, abandoned.

[30] Foreign Application Priority Data

Sep. 30, 1981 [JP] Japan .................................. 56-156366

[51] Int. Cl.[4] .............................................. F16H 1/02
[52] U.S. Cl. ...................................... 74/800; 74/459.5
[58] Field of Search ................. 74/797, 799, 800, 802, 74/459.5

[56] References Cited

U.S. PATENT DOCUMENTS

| | | | |
|---|---|---|---|
| 1,285,870 | 11/1918 | Wingqvist | 74/459.5 |
| 1,710,349 | 4/1929 | Croft | 74/459.5 |
| 2,908,191 | 10/1959 | Sundt | 74/797 X |
| 2,971,788 | 2/1961 | Wildhaber | 74/459.5 |
| 3,085,451 | 4/1963 | Morin | 74/800 |
| 3,640,154 | 2/1972 | Massie | 74/800 |
| 3,703,108 | 11/1972 | McCaw | 74/459.5 |

FOREIGN PATENT DOCUMENTS

| | | | |
|---|---|---|---|
| 992353 | 7/1976 | Canada | 74/800 |
| 2445209 | 4/1976 | Fed. Rep. of Germany | 74/800 |
| 620214 | 5/1961 | Italy | 74/800 |

Primary Examiner—Leslie Braun
Assistant Examiner—Dwight G. Diehl
Attorney, Agent, or Firm—Wenderoth, Lind & Ponack

[57] ABSTRACT

An axial gear train having syncline face cycloid gearing which includes an opposed, spaced apart first pair of face gears each of which is rotatably carried on respective shafts having a common axis, an inclined shaft fixed to the end of one of the two shafts, the inclined shaft having an axis passing at a point between the two face gears, and inclined at a given angle to the common axis, a face cycloid gear rotatably supported on the inclined shaft and a second pair of face gears, wherein the mating first and second face gears have a different number of teeth and the same modules, and wherein at least one of the mating face gears having the converged point of the tooth shapes of the tooth faces thereof displaced from the pitch cone vertex thereof along the generator of the pitch cone with the amount of displacement being equal to that of the displacement between the pitch cone vertices of the mating face gears to thereby ensure that the mutual teeth thereof are in accord with the tooth trace along their full length.

4 Claims, 9 Drawing Figures

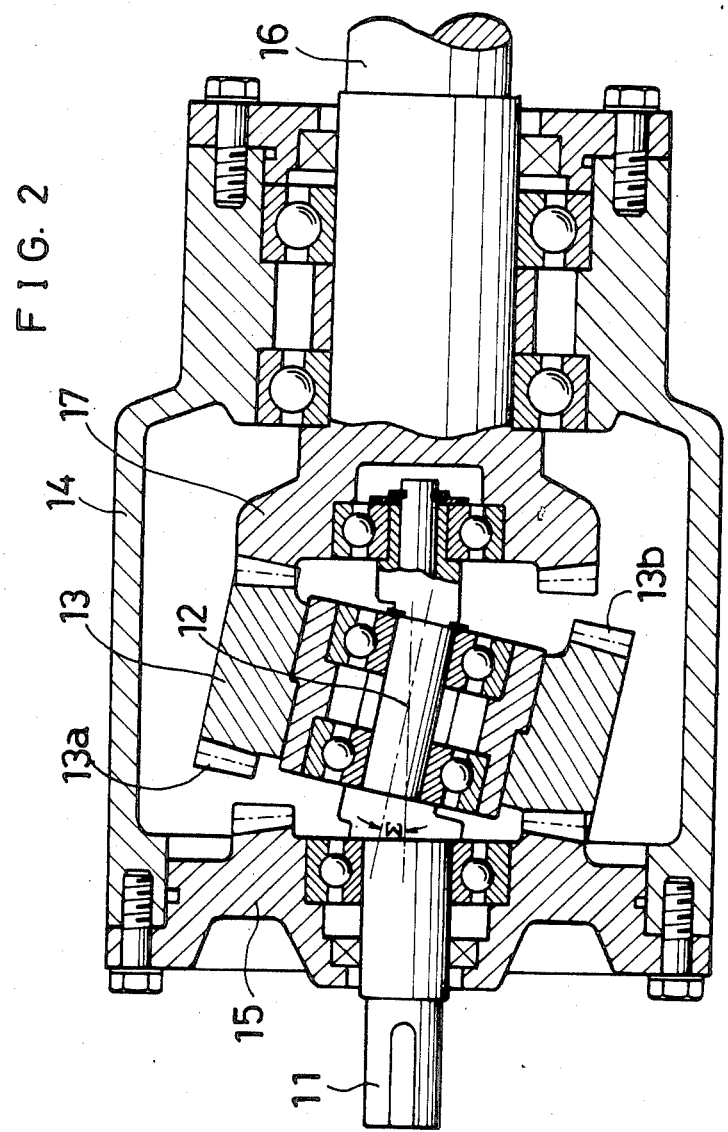

PRIOR ART FIG. 3
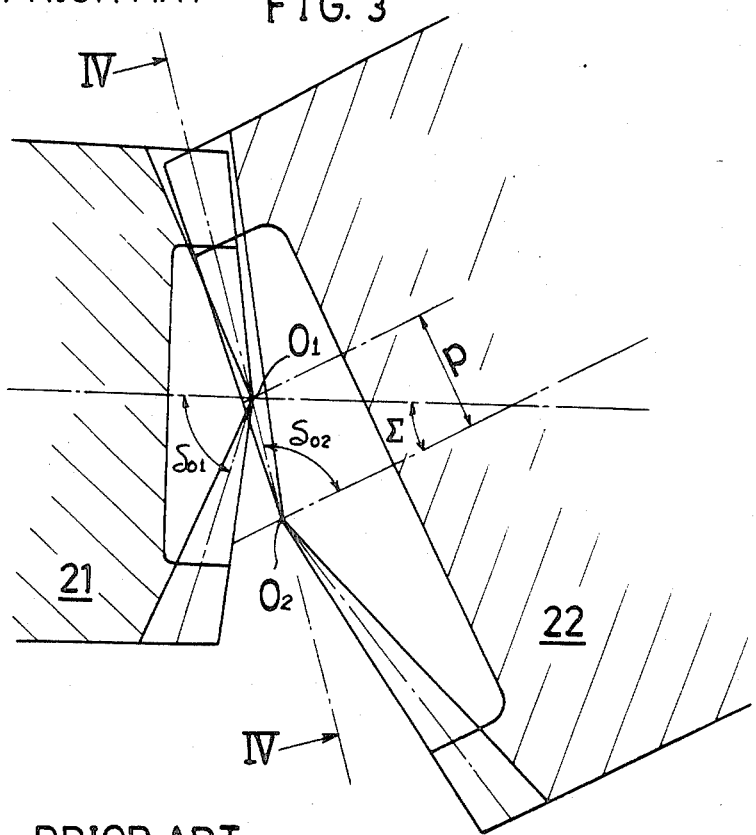
PRIOR ART FIG. 4
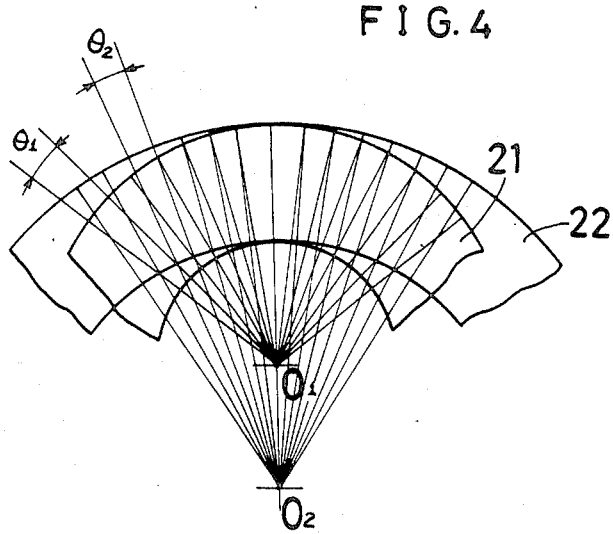

AXIAL GEAR TRAIN HAVING SYNCLINE FACE CYCLOID GEARING

This application is a continuation-in-part of application Ser. No. 431,089, filed Sept. 30, 1982, now abandoned.

BACKGROUND OF THE INVENTION

The present invention relates to a syncline face cycloid gearing, and more particularly, to a syncline face cycloid gearing having a second face gear located between two opposingly located first face gears, wherein the second face gear engages with the first face gears at its opposite sides, and wherein the second face gear rotatably supports face cycloid gears provided in each end face thereof on an inclined shaft capable of conical wobbling motion. The number of teeth of each gear is adjustable so as to effect speed reduction.

It is known in the art that the speed reduction is effected with the use of bevel gears carried on a conical wobbling shaft, but from a practical point of view the effect of the known practice is doubtful, in that the power loading capacity is limited, and its working life is short. So far, no successful model has been accomplished for commercial use. As a result of a long period of study and research, it has been found that the reason is attributed to the tooth profiles adopted in the bevel gears used therein, and to the method of shaping such tooth profiles. Under the conventional methods it was geometrically impossible to shape quite the same tooth profiles on each of the bevel gears of the mating pair. Nevertheless, such difficult tooth profiles were demanded for manufacturing speed reduction devices in which bevel gear trains were essential. However, this demand was very much frustrated under the conventional methods, and as an alternative choice the seemingly same tooth profiles were formed on each of the mating bevel gears. But it is needless to say that such attempts have proven to be unsuccessful in that the speed reduction device caused malfunction and inadequate performance.

SUMMARY OF THE INVENTION

The present invention is directed at solving the difficulty pointed out with respect to the conventional speed reduction by bevel gearing, and it is an object of the present invention to provide a syncline face cycloid gearing capable of speed reduction with satisfactory loading capacity, working life and noise considerations.

In this specification the gears employed in the syncline face cycloid gearing are not the conventional bevel gears in terms of the shape of teeth and the gear making method, and it must be noted that although the term gear is used, it is quite different from the known bevel gears. They will be defined as follows:

The face gear means a gear which has a pitch cone angle of 90°±10° and when it is 80° to 90° the gear will be called a convex face gear whereas, when it is in the range of 90° to 100°, it will be called a concave face gear. This face gear has involute teeth each of which has a right angle cross-section of its dedendum equal to the pressure angle of the cutting tool at the standard P.C.D. point thereof.

The shift means as follows:

One of two face gears having different numbers of shift teeth is fixed to a shaft crossing at a given angle with another rotary shaft which supports the other face gear. The outer end face modules of these two face gears are equal, and they are placed in engagement with each other. In this situation their pitch cone vertices are not in accord with each other. In the situation of this engagement one of the two face gears is shaped such that their teeth are in accord with the tooth trace at the maximal osculated point. The result of this shaping is called the offsetting. The opposite tooth faces of each shift face gear converges outward of or inward of its own pitch cone vertex. When the tooth face converges outward of it, it will be termed the positive shift, whereas, when it converges inward of it, it will be termed the negative shift.

According to the present invention, there is provided a syncline face cycloid gearing, which comprises:
 opposed, spaced apart first face gears rotatably carried on respective shafts on the same axis;
 an inclined shaft fixed to the end of one of the two shafts, the inclined shaft having an axis passing at a point between the two first face gears, and inclined at a given angle to the reference axis;
 a face cycloid gear rotatably supported on the inclined shaft and having second face gears at opposite end faces thereof which engage the first face gears, the first and second pairs of the face gears having pitch cone vertices which do not coincide;
 wherein the mating first and second face gears have a different number of teeth and the same module, and
 wherein at least one of the mating face gears has a converged point of least one of the mating face gears has a converged point of the tooth faces of each gear tooth thereof displaced from the pitch cone vertex, each converged point being displaced from the pitch cone vertex by an equal amount thereby to ensure that the mutual teeth thereof are in accord with the tooth trace, along their full length.

BRIEF DESCRIPTION OF THE DRAWINGS

FIG. 2 is a cross-section through a speed reduction device including a syncline face cycloid gearing according to the present invention;

FIG. 3 is a diagrammatical cross-section taken along the tooth traces to show a relationship between a fixed face gear and a face cycloid gearing by a known design;

FIG. 4 is a cross-section taken along the line IV—IV in FIG. 3;

DETAILED DESCRIPTION OF THE INVENTION

Figure 1:
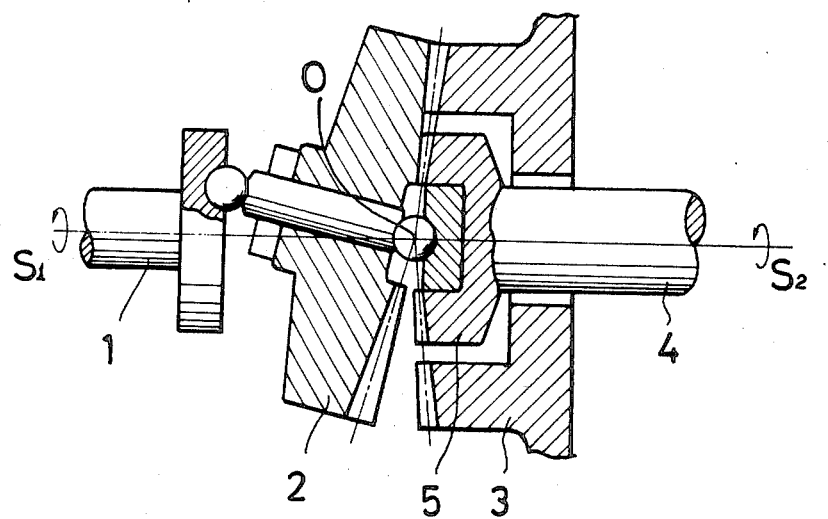
FIG. 1 is a schematic cross-section showing a prior art speed reduction device employing a bevel gear train.

In order to explain the background of the present invention, reference will be more particularly made to a typical example of a speed reduction device employing a bevel gear train known in the art, shown in FIGS. 1, 3 and 4. In the embodiment illustrated in FIG. 1, when the input shaft 1 is rotated, a conical wobbling gear 2 initiates its conical wobbling motion. The gear 2 is engaged with a fixed gear 3 provided coaxially with the input shaft 1, and also with a follower bevel gear 5 fixed to the output shaft 4. In this prior art device the pitch cone vertices of the gear 2 and the fixed bevel gear 3 are accorded at a point O on which the conical wobbling motion is effected. Seemingly, this arrangement ensures a smooth, trouble-free rolling motion between the mating bevel gears. However, in order to effect the speed reduction from the input shaft 1 through the output shaft 4, the number of teeth of the gear 2 must be different from that of the fixed bevel gear 3. If the input shaft 1 is rotated at a speed $S_1$(r.p.m.), the gear 2 is put into conical wobbling motion at the speed $S_1$, and at the same time, it is rotated on its own axis through the action of the fixed bevel gear 3, wherein the speed of this rotation is expressed by:

$$S_1 \times 1/(Z_1 - Z_2)$$

where:

$Z_1$ is the number of teeth of the conical wobbling gear 2, $Z_2$ is the number of teeth of the fixed bevel gear 3

This rotation of the conical wobbling gear is picked up by the follower bevel gear 5, and is transmitted to the output shaft 4 at a speed expressed by the following formula:

$$S_2 = S_1 \times 1/(Z_1 - Z_2)$$

As evident from the foregoing, the conical wobbling gear 2 and the fixed bevel gear 3 must have a standard pitch circle of the same reference but different numbers of teeth. This necessarily leads to different tooth profiles, which will be fatal for the gears in mesh. Malfunction, heat generation, noise and a short working life are thus caused. In order to improve such situations, rollers, balls and a highly viscous lubricant were used to ensure a smooth meshing of the gears. However, those troubles are due to the fundamental defects in structure, and no solution has been achieved.

Referring now to the speed reduction device illustrated in FIG. 2, the device comprises a housing 14, an input shaft 11 rotatably inserted in one end of the housing 14, and an output shaft 16 rotatably inserted in the opposite end thereof. Power imparted to the input shaft 11 causes it to rotate at a speed which is reduced when transmitted to the output shaft 16. Inside the casing 14, there is provided an intermediate shaft 12, which is integral with the input shaft 11 but inclined at an angle of $\Sigma$ with respect to the axis thereof. The intermediate shaft 12 is provided with a face cycloid gear 13 having face gear teeth 13a, 13b at its opposite ends. Opposedly to the face cycloid gear 13, there is provided a face gear 15 fixed to the housing 14 such that the face gear teeth are concentric with the input shaft 11. The face gear teeth of face gear 15 are intended to mesh with the teeth 13a of the face cycloid gear 13. The output shaft 16 is provided coaxially with the input shaft 11, and is provided with a follower face gear 17 having face gear teeth intended to mesh with the teeth 13b of the face cycloid gear 13. The power from the input shaft 11 is thus transmitted to the follower face gear 17 through the face cycloid gear 13.

Suppose that the number of teeth in the fixed face gear 15 is $Z_1$. Likewise, suppose that the numbers of teeth in the face gears 13a, 13b and 17 are respectively $Z_2$, $Z_3$ and $Z_4$. The rotating speed (r.p.m.) of the input shaft 11 is presupposed to be $S_1$, which, after having been reduced to $S_2$, is transmitted to the output shaft 16. When the input shaft 11 is rotated at the speed $S_1$, the face cycloid gear 13 starts its face cycloid motion at the speed $S_1$ through the conical wobbling motion of the intermediate shaft 12. While it is in the face cycloid motion, the face cycloid gear 13 starts its own rotation through the meshing of the face gears 13a and 15, wherein the rotation speed of the face cycloid gear 13 is numerically expressed by the following formula:

$$S_1 \times \frac{Z_2 - Z_1}{Z_2}$$

The rotation of the face cycloid gear 13 is transmitted to the follower face gear 17, commonly called "picked up", wherein the rotation speed of the follower face gear 17 is numerically expressed by the following formula:

$$S_1 \times \frac{Z_2 - Z_1}{Z_2} \times \frac{Z_3}{Z_4}$$

The follower face gear 17 is rotated on its own axis in accordance with the face cycloid motion of the face cycloid gear 13, wherein the rotation is numerically expressed by the following formula:

$$S_1 \times \frac{Z_4 - Z_3}{Z_4}$$

In this way, when the input shaft 11 is rotated at the speed $S_1$, it is reduced to the speed $S_2$, which can be numerically expressed by:

$$S_2 = S_1 \times \left( \frac{Z_2 - Z_1}{Z_2} \times \frac{Z_3}{Z_4} + \frac{Z_4 - Z_3}{Z_4} \right)$$

$$= S_1 \times \left( 1 - \frac{Z_1 Z_3}{Z_2 Z_4} \right)$$

The rotation of the follower face gear 17 is transmitted to the output shaft 16 at a reduced speed.

The foregoing principle is the basic idea underlying the present invention. In addition, it must be noted that each face gear has a uniquely shaped tooth profile. Take for an example the face cycloid gear 13 and the fixed face gear 15:

The speed reduction device having the basic structure shown in FIG. 2 can be assembled with conventional bevel gears or face gears not having a shift structure. As described in the background of the invention, the speed reduction device is not practicable for the reason given below:

FIG. 3 shows one example of the prior art face gear train, which consists of a fixed face gear 21 and a conical wobbling face gear 22. These gears are known types, normally used for a gear train. FIG. 3 shows a cross-section taken along the tooth traces at the maximal osculated point of contact of the two gears 21 and 22. In this gear train the vertices of the addendum cone, pitch cone and dedendum cone coincide at a point $O_1$ or $O_2$ on the axis either of the gears 21 or 22. This means that the tooth surface of each gear 21, 22 is converged on the vertex $O_1$ or $O_2$ of the pitch cone.

The face gear of this kind which does not have a shift structure, is termed a standard face gear. In order to ensure that the two face gears engage with each other at an angle of $\Sigma$, and that the conical wobbling motion of the gear 22 is effected, the sum of the vertex angles of the pitch cones of these face gears $\delta_{01}$, $\delta_{02}$ must be equal to $(180°-\Sigma°)$. At the same time each face module m must be equal at the exterior end of the pitch cones, commonly known as the reference P.C.D. Therefore, suppose that the fixed face gear 21 has a smaller number of teeth $Z_1$ than the number of teeth $Z_2$ of the conical wobbling face gear 22, the following equation is established:

$$P = m(Z_2 - Z_1)/2$$

where: P is the distance between the vertices $O_1$ and $O_2$

As evident from the foregoing, if the speed reduction device aimed at by the present invention is constructed with the known normal face gear train, the design itself will have no problem. However, from a practical point of view it will prove to be worthless or at least serious problems will be encountered. FIG. 4 shows another aspect of the prior art gearing illustrated in FIG. 3. The face gears 21, 22 have equal face modules m, m, but their pitch cone vertices $O_1$, $O_2$ are separated from each other by a distance P. In such cases their tooth thicknesses (or space thicknesses) are inclined at different angles $\theta_1$, $\theta_2$ with respect to their respective tooth traces. When $Z_1$ is smaller than $Z_2$, the relationship $\theta_1 > \theta_2$ results. Accordingly, the face gears 21 and 22 come into point-to-point contact with each other only at the exterior end of the pitch cones (the reference P.C.D.), and fail to mesh with each other at the interior end thereof. In the practical application this will cause malfunction of the device, heat generation, noise problems, and fatally, the power loading capacity is immensely reduced. In addition, the working life is shortened. From a practical point of view a gearing of this type must be condemned as worthless.

Figure 5:
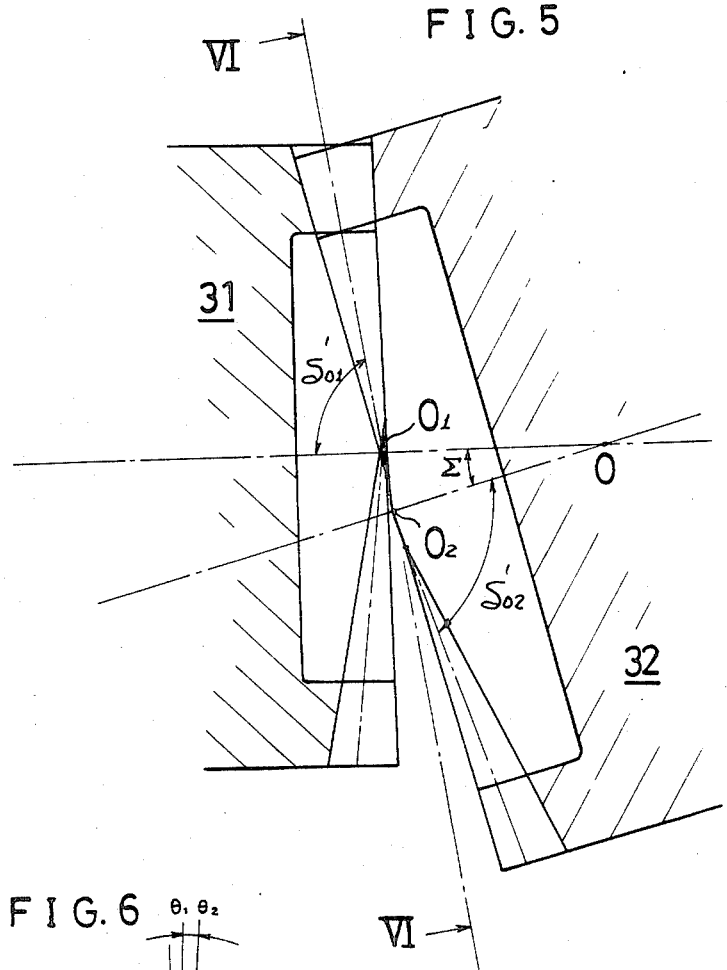
FIG. 5 is a diagrammatical cross-section under the present invention, shown in a similar manner to FIG. 3.

FIG. 5 shows a cross-section of the mutually engaging face gears, taken along the tooth trace at the maximal osculated point. Herein the face gears 31 and 32 are opposed to the fixed face gear 15 and the face gear teeth 13a of the face cycloid gear 13 shown in FIG. 2. The vertex angles $\delta'_{01}$ and $\delta'_{02}$ of the pitch cones of the face gears 31 and 32 are, when the angle of incline is $\Sigma°$, expressed by:

$$\delta'_{01} = \delta'_{02} = 90° - \Sigma°/2$$

The relationship between the number of teeth $Z_1$ of the face gear 31 and that $Z_2$ of the face gear 32 is expressed by:

$$Z_1 < Z_2$$

To each face gear 31 and 32 are given an equal amount of the positive shift and the negative shift. In other words, the teeth of the face gear 31 are shaped so as to ensure that each tooth face thereof converges outward of its own pitch cone vertex $O_1$, and the teeth of the face gear 32 are shaped so as to ensure that each tooth face thereof converges inward of the pitch cone vertex $O_2$. The distance between the pitch cone vertices $O_1$ and $O_2$ of the mating gears 31 and 32 and the respective points of convergence thereof is equal and is regarded as the amount of shift for each face gear 31 and 32, which is expressed by:

$$P/2 = m(Z_2 - Z_1)/4$$

Figure 6:
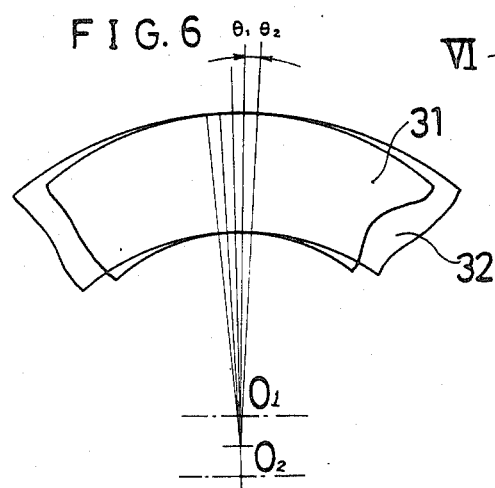
FIG. 6 is a cross-section taken along the line VI—VI in FIG. 5.

It will be appreciated from FIG. 6 that owing to the tooth profiles designed in this way the tooth thicknesses (or space thicknesses) of the two gears 31 and 32 are inclined at the equal angles $\theta_1$, $\theta_2$ with respect to their respective tooth traces.

Herein, the rotating shaft of the face gear 32 is caused to wobble conically around the center O in FIG. 5 with respect to the rotating shaft of the face gear 31. At this stage the generators of pitch cone thereof are in accord, and the tooth faces thereof are kept in full contact with each other, thereby causing the face gear 32 to rotate in association with the rotation of the face gear 31. In this way the face cycloidal motion of the face gear 32 is effected.

Figure 7:
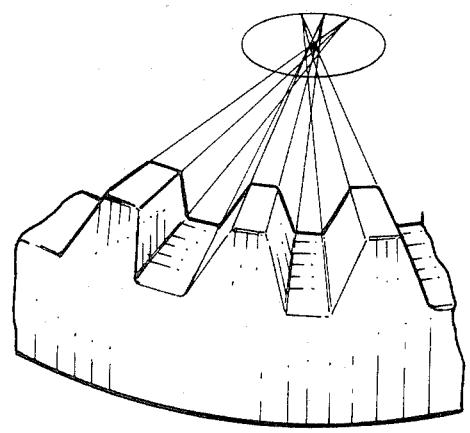
FIGS. 7 and 8 are perspective views showing the tooth profiles, wherein a greater part thereof is omitted for simplicity.
Figure 8:
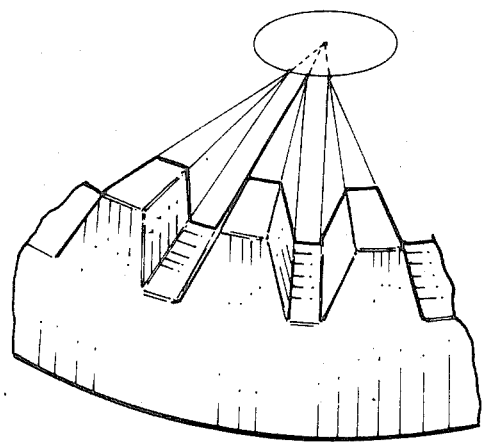

FIGS. 7 and 8 perspectively show the face gears having a negative shift and positive shift, respectively.

The method of producing the face gears with a positive shift and negative shift will be described:

A metal blank to be hobbed is mounted on a dividing head capable of rotation and conical wobbling. It is required that the material must be mounted thereon in the same relationship as the designed center O for the conical wobbling motion shown in FIG. 5 with respect to the center for the wobbling on the dividing head. Then the material is caused to wobble conically around the reference center, wherein the motion is expressed by $\Sigma°$, and to rotate by a fraction of a difference in the numbers of teeth between the engaging face gears. A rack cutter is used, wherein the edge is reciprocated along the designed dedendum cone during which the cutting tool edge line is caused to come into contact with the material. When a deep cut is made by the tool line, the positive shift is effected as shown in FIG. 8, and when a shallow cut is made, the negative shift is effected as shown in FIG. 7.

In this way the material is cut during its conical wobbling motion and rotation. According to this method the errors occurring in tooth dividing infinitely comes near to zero in the course of repeated processing. More concretely, the high tooth crests are reduced in the course of process, whereas the low tooth crests remain uncut. As a whole the height of the tooth crests are finally equalized. In contrast, under the conventional hobbing method the errors ocurring in tooth dividing accumulate in one tooth. The method mentioned above has overcome this problem.

The teeth of the face gear cut in this way has a vertical cross-section (passing the root of the tooth) of an involute curve equal to the tool pressure angle. As described above, the vertex angle of pitch cone of the shift face gear is expressed by $(90° - \Sigma°/2)$, wherein the $\Sigma°$ is normally 4° to 8°. Accordingly, the curvature of the involute curve is sufficiently large to be virtually equal to that of a rack tooth.

The three-dimensional examination of the face gear shift in the aforementioned way reveals that the tooth trace is formed in a curve which shows an increase in the pressure angle in its inside. This is because the side of the inside wall is initially cut from the moment when the tool is engaged therewith, and at the maximal osculated point the cutting is brought to zero. For this reason, if the face gear is used as it is, and when the two face gears positively and negatively shift are in engagement, they keep contact in rolling only at the standard P.C.D. point. In the tooth direction and the tooth trace a sliding contact occurs thereby to cause a gearing motion. To remedy this, the following finish process is required:

The finish process is effective to make the engaging teeth of the face gears be brought into full contact with each other. Each face gear is lapped with a lap having the same tooth shape as that of the mating face gear. The amount of lapping depends on the speed and pressure of the lapping. The rolling contact point is free from the lapping, and the lapping speed increases toward the inside, thereby carrying out the remedy efficiently. When a soft alloy, such as aluminum alloy, is used as the lap, and when a quenched steel is used as the material for the face gear, the abrasive powder is retained on the lap. As a result, the abrasion occurs only in the material, and does not occur in the lap.

Figure 9:
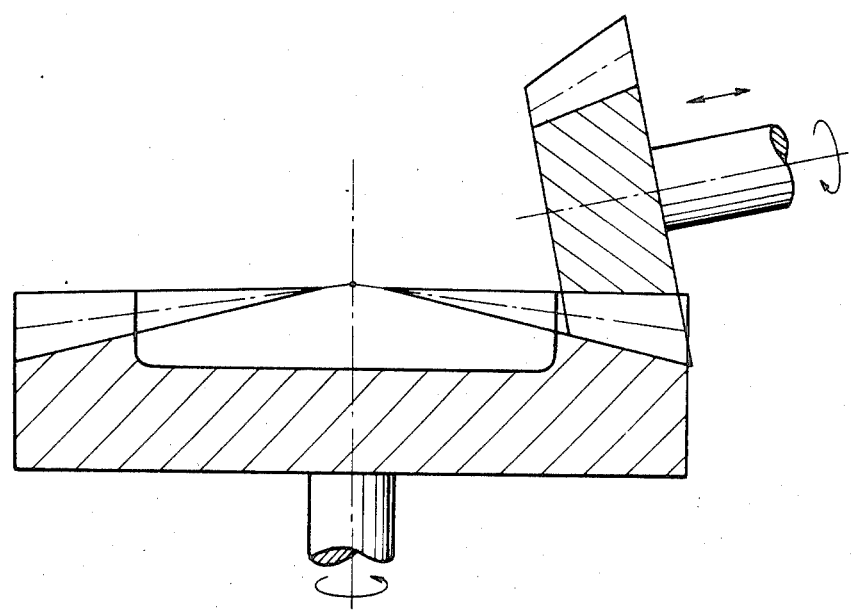
FIG. 9 is a diagrammatic view exemplifying a method of finish-shaping a tooth profile of the syncline face cycloid gearing according to the present invention.

The lapping can be carried out with the use of a pinion-like lap as shown in FIG. 9. When this type of lap is used, its tooth shape is shaped so as to have the same shape as that of the face gear to be lapped, and also has a negative shift. For this purpose a pinion rack having a relatively small gearing ratio, such as 1 to 1.5, is used. With the use of such a pinion rack, the tooth thickness is smaller than the groove thickness because of the negative shift, the lap can be reciprocated along the tooth trace while it is rotated with its teeth being in engagement with those of the lapping face gear. It is also possible to change the gearing angle, which makes it possible to change the gearing pressure. Thus the efficient remedy is carried out with respect to the tooth shapes of the face gear being processed. In this case, the difference between the numbers of teeth of the pinion lap and that of the face gear being lapped can be an odd number, and the ratio of the numbers of teeth can be a number other than an integer, whereby errors in the pitches can be remedied due to the gradual shift of the engaging teeth.

In the gearing mechanism shown in FIG. 2, if the engaging fixed face gear 15, the face gear 13a of the face cycloid gear 13, the follower face gear 17, and the face gear 13b of the face cycloid gear 13 are composed of the combination of shift face gears shown in FIG. 5, the face gears 13a and 15, and the face gears 13b and 17 are kept in facial contact with each other, which leads to a practicable load capacity, a long life and a noiseless operation.

In the gearing mechanism shown in FIG. 2, if the shaft 11 is fixed, and the face gear 15 is mounted rotatably with respect to the housing 14, and it is rotated at the r.p.m of $S_3$, the r.p.m. of the output shaft 16 can be calculated by:

$$S_2 = S_3 \frac{Z_1 \cdot Z_3}{Z_2 \cdot Z_4}$$

In the gearing mechanism shown in FIG. 2, if the shaft 11 and the face gear 15 are mounted rotatably with respect to the housing 14, and if the shaft 11 and the face gear 15 are simultaneously rotated at the r.p.m. of $S_1$ and $S_3$, respectively, the r.p.m. of the output shaft 16 can be calculated by:

$$S_2 = S_1 \times \left(1 - \frac{Z_1 \cdot Z_3}{Z_2 \cdot Z_4}\right) \pm S_3 \frac{Z_1 \cdot Z_3}{Z_2 \cdot Z_4}$$

Wherein the sign (+) indicates that the shaft 11 and the face gear 15 are rotated in the same direction, whereas the sign (−) indicates that they are rotated in different directions.

In the embodiments described above the mating face gears have a positive or negative shift, but the present invention is not limited to this arrangement. It is of course possible that the shift is appropriately given so as to ensure that the teeth of both face gears are mutually in engagement at the maximal osculated point. For example, in FIG. 5 it is possible that the face gear 32 is a standard face gear, whereas the other face gear has a positive shift by the same degree as that indicated above.

In the illustrated embodiments the face gears are straight face gears, but it is also possible to use skew gears or spiral gears with the same effects.

What is claimed is:

1. An axial gear train having syncline face cycloid gearing which comprises:
   a first pair of opposed, spaced apart face gears supported on respective shafts having a common axis;
   an inclined shaft fixed to the end of one of the shafts, the inclined shaft having an axis passing a point between the two face gears, and inclined at a predetermined angle to the common axis;
   a face cycloid gear rotatably supported on the inclined shaft and having a second pair of face gears at opposite end faces thereof which engage the first pair of face gears, with the pitch cone vertices of the second pair of face gears not coinciding;
   the first face gears having a different number of gear teeth than the second face gears and the first and second pairs of face gears having the same modules;
   each tooth of the face gears having the same angle toward the center of tooth thickness, and the generators of their pitch cones being in agreement at the maximal osculated point and their tooth shape being in agreement in the tooth traces; and
   at least one of the face gears having all the tooth faces of each gear tooth thereof converging at a common converged point, and the converged point of the tooth faces displaced from the pitch cone vertex thereof, each converged point being displaced from the pitch cone vertex by an equal amount.

2. An axial gear train having syncline face cycloid gearing as set forth in claim 1, wherein the converged points of tooth faces of each pair of face gears are displaced from their own vertices of pitch cones in opposite directions but with the same amount of displacement.

3. An axial gear train having syncline face cycloid gearing as set forth in claim 1, wherein the converged points of tooth faces of at least two mating face gears are displaced from their pitch cone vertices, the converged point of one face gear being spaced inwardly of its pitch cone vertex and the converged point of the other mating face gear being spaced outwardly of its pitch cone vertex, each of the converged points being spaced from its respective pitch cone vertex by the same distance.

4. An axial gear train having syncline face cycloid gearing as set forth in claim 1, wherein at least one of said first pair of face gears has a lower number of gear teeth than the number of gear teeth on the mating one of the second pair of face gears.

* * * * *